June 4, 1935. M. SCHNAIER 2,003,518
APPARATUS FOR AND METHOD OF PROCESSING FROZEN CONFECTIONS
Filed March 18, 1931
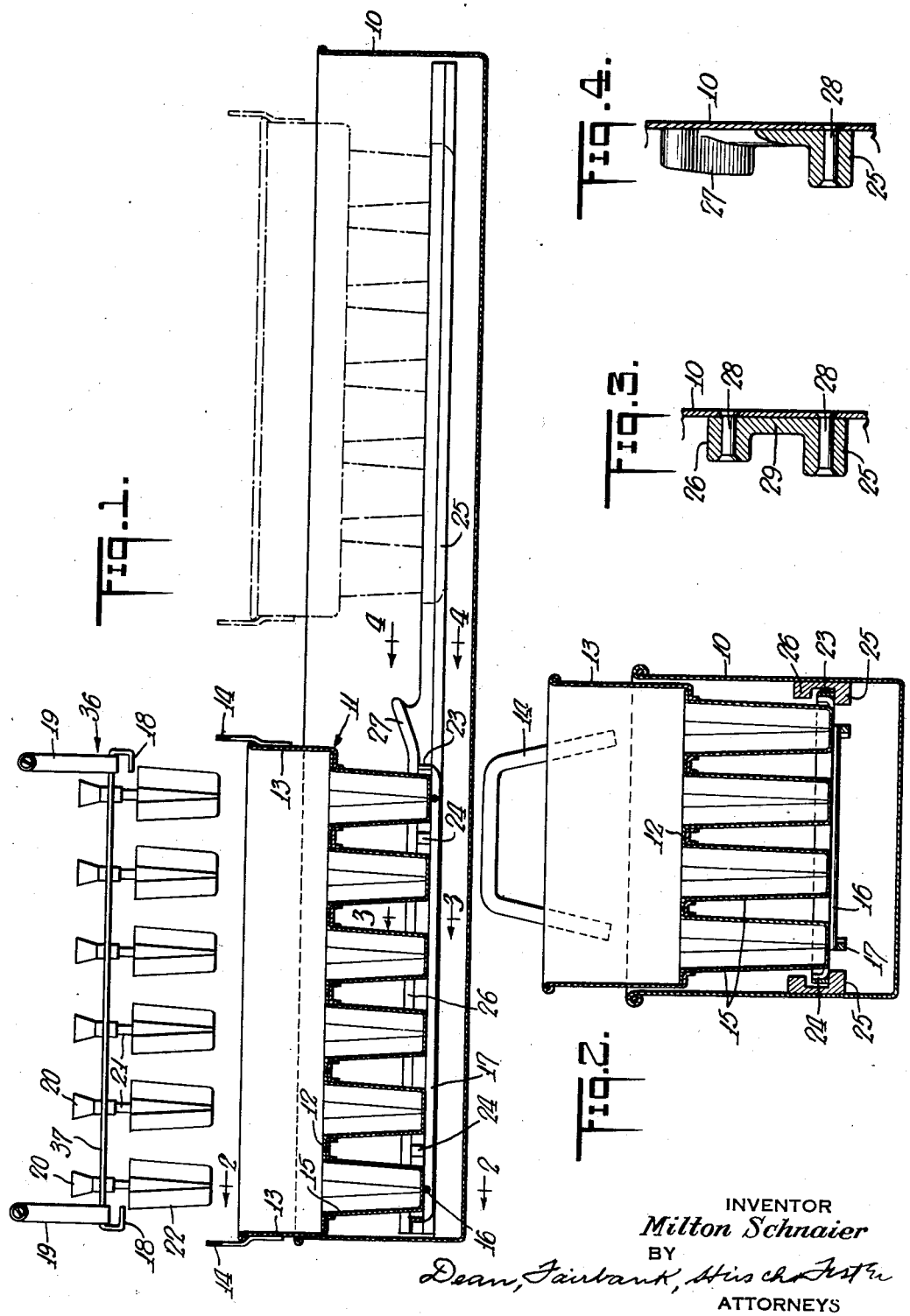
INVENTOR
*Milton Schnaier*
BY
Dean, Fairbank, His ch. Foster
ATTORNEYS Patented June 4, 1935

2,003,518

UNITED STATES PATENT OFFICE 2,003,518

APPARATUS FOR AND METHOD OF PROCESSING FROZEN CONFECTIONS

Milton Schnaier, New York, N. Y.

Application March 18, 1931, Serial No. 523,479

8 Claims. (Cl. 107—8)

My present invention is concerned with the handling of molded products, particularly with the problem of simultaneously withdrawing a plurality of such products from a multiple-compartment mold. While the invention in its broader aspects, is capable of a wider range of usefulness, it finds its preferred embodiment in a method of and apparatus for facilitating the simultaneous removal of a plurality of handled frozen confections or analogous articles from the molds in which they are frozen.

I have previously devised a method and apparatus for effecting the removal of such articles from their molds, the apparatus including a handling, centering and carrying member, from which depended a plurality of handle sticks or the like. This member was placed upon the top of a multiple-compartment mold with the sticks entering and properly centered with respect to the mold cavities containing the liquid or semi-liquid substance to be frozen about the sticks. After the freezing operation had been completed, the molds were defrosted and the stick carrier then bodily elevated to lift all of the confections by their handles from the individual molds.

This process, while in general satisfactory, particularly where a comparatively small number of articles were frozen in a mold, develops certain latent difficulties when carried out in connection with a mold having a great number of mold cavities. The increased suction which must be overcome to simultaneously withdraw a great number of articles from their molds, has a tendency at times, to become so great that the mold will be picked up with the handle carrier, or partially picked up, sometimes dropping back into the defrosting tank, with the possibility of injury to the mold or of splashing the defrosting liquid on the confections.

These difficulties are completely overcome by my present invention, in which the molds having the frozen confections therein, are firmly held against upward displacement, as the stick carriers are lifted to release the confections. Regardless of the resistance which may be opposed to the lifting action due either to imperfect defrosting or to the suction which opposes the lifting action there is no danger of picking up the molds while removing he confections from them.

The process suggested above, that is the process by which the molds are held against upward displacement during the removal of the confections, may be carried out by various instrumentalities, but I have designed an extremely simple combination of mold and defrosting tank, in which the mold, when in one position within the tank, interlocks with the latter to prevent upward displacement of the mold. Preferably the defrosting tank or one portion thereof, is provided with rails and the mold is provided with corresponding rails adapted to interlock with the tank rails by sliding thereunder. When so held, the stick carrier may be conveniently grasped and lifted upwardly, withdrawing all of the confections from the molds without any danger of displacing the molds proper. The alterations which are required in the mold structure and in the defrosting tank structure, are of a very minor nature to the end that the increase of the cost of manufacturing equipment is negligible and the increase in efficiency particularly with molds having a great number of molding units, is great.

The invention may be more fully understood from the following description in connection with the accompanying drawing, wherein Fig. 1 is a longitudinal sectional view through a defrosting tank, showing a mold locked therein against upward displacement and showing the position of the handle carrier as it is lifted out of the mold with the frozen confections attached to the handles. In this figure, a second dotted line position of the mold is shown wherein the mold may be freely lifted from the tank.

Fig. 2 is a transverse sectional view on the line 2—2 of Fig. 1; and

Figs. 3 and 4 are transverse sectional details of the locking rail structure of the defrosting tank taken approximately on the lines 3—3 and 4—4 of Fig. 1.

Referring with particularity to the drawing, I have used the reference numeral 10 to designate a defrosting tank, which save for the presence of the rails which I shall later describe, is in the nature of a simple, rectangular, open topped, liquid-tight container adapted to receive a suitable amount of water or other defrosting fluid. A mold is indicated generally at 11 and it will be seen that this mold comprises a pan portion 12, having upstanding side flanges 13, with which are associated suitable handles 14. The individual mold compartments 15 have liquid tight bottoms and have their open mouths fixed by crimping or otherwise at corresponding openings in the pan 12. The bottoms of the individual mold cavities 15 are connected by cross pieces or bracing members 16, which in turn are joined to longitudinally extending runners 17, adapted to facilitate sliding the mold units about at various stages of the confection making operation. Preferably the mold cavities taper from their mouths to their closed bottoms in order to facilitate the withdrawal of the frozen confections therefrom.

The stick carrying and centering device indicated generally at 36, is here shown in diagrammatic form. A complete description of this apparatus may be found in my copending applications, Serial No. 500,457, filed December 6th, 1930, and Serial No. 506,373, filed January 3rd, 1931, now Patent No. 1,966,048. To describe the device generally, however, it consists of a suitable horizontal frame 37, provided with feet 18, at its ends, adapted to rest upon the pan portion of the mold and provided with handle members 19, so that the carrier may be lifted out of engagement with the mold. Mounted on the frame 37, are a plurality of stick receiving and gripping units indicated diagrammatically at 20, and within these units, the upper ends of the handle sticks 21 are suitably gripped and clamped. Means is provided for selectively gripping or releasing the upper ends of the sticks and for so gauging the sticks relatively to the centering devices that they all depend equal distances from the frame 37, to promote uniformity of product.

As thus far described, the mold and the defrosting tank and the stick carrier are in accordance with general practice or with my prior inventions above identified.

In order to overcome the tendency of the mold to be lifted up with the stick carrier as the handles of the latter are grasped and lifted to withdraw the confections 22 frozen into the handles 21, I provide interlocking devices associated with the defrosting tank and the mold and here illustrated as interlocking rails. The mold 11 is provided with a rectangular frame 23, encompassing and slightly spaced from the lower ends of the mold cavities or the individual molds 15. This frame 23, which of course, presents two longitudinally extending side rails, may be rigidly fixed to the rails 16, 17 in any manner. It is illustratively attached thereto by the use of angle brackets 24, having their ends riveted, welded or otherwise secured to the frame 23 and to the runners 17 respectively.

Spaced slightly above the bottom of the defrosting tank 10 and extending longitudinally of each side thereof, are rails 25. The width of the tank is such that the side rails of the mold frame 23 normally rest upon the rails 25 and the mold is supported on these rails as it is moved back and forth in the defrosting tank into and out of interlocking engagement with the locking rails 26. These latter are provided at one end of the tank only, being spaced from the rails 25, a distance slightly greater than the height of the frame 23. At approximately the center of the tank where the mold in its travel, passes under the rails 26, the latter are provided with upwardly turned ends 27 designed to facilitate guiding of the frame 23 into position.

As is best seen from Figs. 3 and 4, each rail 26 may be cast or otherwise formed integrally with its associated rail 25 and the complete rail units secured to the inner face of the tank walls by rivets 28, it being understood that these rails should be secured in a manner which will prevent the escape of liquid from the tank.

In operation, the molds with the stick carriers resting thereon and with the confections frozen to the sticks, are withdrawn from the freezing chamber and lowered into the right hand end of the freezing tank, assuming the dotted line position illustrated in Fig. 1. The molds are then slid to the left so that the frames 23 or rather the longitudinal side bars thereof, which rest on the rails 25, are moved under the blocker rails 26 and locked thereby to hold the mold unit against upward displacement. During this period of time, the bond between the individual mold cavities and the frozen confections will have been melted and the handle carrier 16 may be grasped by its handles 19 and lifted vertically upwardly. In this operation, all of the confections are withdrawn by their handles to which they are frozen and the mold is held against upward displacement by the rails 26. The mold is now slid back to its original position in the right end of the tank and removed and the operation repeated with a new mold.

The frame 23 is of special advantage in providing an interlock with the defrosting tank as discussed above, but entirely aside from this function, the presence of the frame which completely encircles the lower ends of the individual mold forms, aids materially in protecting these forms against injury and against inadvertent lateral contact with extraneous objects.

It will thus be seen that there is herein described a method and apparatus in which the several features of this invention are embodied, and which method and apparatus in their action, attain the various objects of the invention and are well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A method of removing frozen, handled confections from multiple compartment freezing molds wherein the handles are affixed to a common carrier member resting on the mold during the freezing operation, which method consists in inserting the molds with the frozen articles therein and the handles attached to the carrier into a defrosting tank having rails at one end thereof to restrain upward movement of a mold slid under the rails and being devoid of such rails at the point where the molds are inserted into the tank, sliding the molds into engagement with the rails so that they are restrained against upward movement and then lifting up the carrier to withdraw all of the confections by their handles.

2. As a new article of manufacture, a defrosting tank having parallel sides, a pair of rails fixed to the inner face of said sides and extending substantially to the end of the tank and adapted to support a freezing mold deposited thereon, a second pair of rails arranged at one portion of the tank only and above and parallel to said first mentioned rails, said second mentioned rails being adapted to block upward movement of the freezing mold when the latter is slid along the first mentioned rails to a predetermined position.

3. As a new article of manufacture, a defrosting tank having parallel sides, a pair of rails fixed to the inner face of said sides and extending substantially to the end of the tank and adapted to support a freezing mold deposited thereon, a second pair of rails arranged at one portion of the tank only and above and parallel to said first mentioned rails, said second mentioned rails being adapted to block upward movement of the freezing mold when the latter is slid along the first mentioned rails to a predetermined position, and means to guide a mold into blocked position between said rails.

4. The combination with a freezing mold, having a pair of rails fixed adjacent its lower end of a defrosting tank, having rails therein under which the rails of the freezing mold are adapted to engage as the latter is slid to a predetermined position in the tank whereby frozen articles may be withdrawn upwardly from the mold without displacing the mold itself.

5. The combination with a freezing mold, having a pair of rails fixed adjacent its lower end, of a defrosting tank having rails therein under which the rails of the freezing mold are adapted to engage as the latter is slid to a predetermined position in the tank whereby frozen articles may be withdrawn upwardly from the mold without displacing the mold itself, the tank also having rails whereon the mold rails rest.

6. In combination, a freezing mold and a defrosting tank in which the lower portion of the mold is adapted to be immersed, said tank being sufficiently long to permit sliding of the mold therein, and interengaging means on the mold and tank coacting when the mold is in one position within the tank to prevent upward displacement of the mold.

7. As a new article of manufacture, a multiple compartment mold of the class described, including a trough like top portion having openings therein and a plurality of individual mold units having open mouths fixed at said openings, a frame work connecting the lower closed ends of the molds to lend rigidity to the mold structure and frame members disposed laterally of and upwardly beyond the lower ends of the individual mold forms, said frame members being rigidly connected to the first mentioned frame and serving to protect the lower portions of the individual mold forms from lateral engagement with extraneous surfaces.

8. A mold as set forth in claim 5 wherein the rails of the mold constitute part of a frame completely encircling the group of pendant mold forms.

MILTON SCHNAIER.